July 3, 1962      F. L. HAUSHALTER      3,041,889
VIBRATION DAMPENER
Original Filed Jan. 26, 1959      2 Sheets-Sheet 1
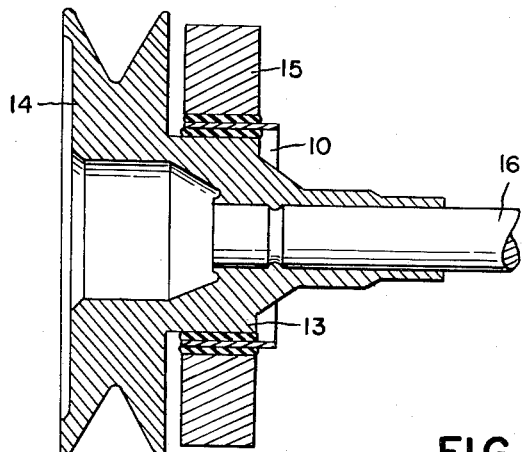
FIG.1.
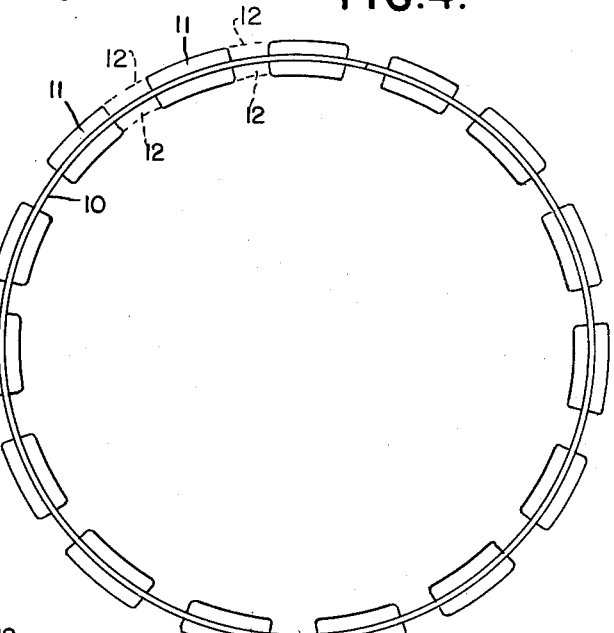
FIG.4.
FIG.5.
FIG.3.
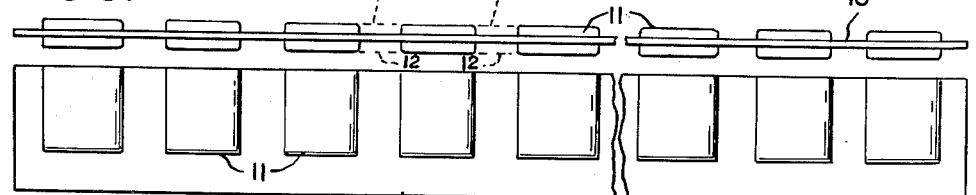
FIG.2.
INVENTOR
FRED L. HAUSHALTER
BY
ATTORNEYS July 3, 1962 — F. L. HAUSHALTER — 3,041,889
VIBRATION DAMPENER
Original Filed Jan. 26, 1959 — 2 Sheets-Sheet 2

INVENTOR.
FRED L. HAUSHALTER
BY
ATTORNEYS

United States Patent Office 3,041,889
Patented July 3, 1962

3,041,889
VIBRATION DAMPENER
Fred L. Haushalter, 2185 Scott Lake Road, Pontiac, Mich.
Original application Jan. 26, 1959, Ser. No. 789,027, now Patent No. 2,977,819, dated Apr. 4, 1961. Divided and this application May 2, 1960, Ser. No. 26,210
11 Claims. (Cl. 74—574)

This invention relates generally to vibration dampeners, and refers more particularly to a vibration dampener having spaced apart inner and outer relatively rotatable members provided with opposed cylindrical surfaces concentric with the axis of rotation of said members and providing an annular space therebetween, and a yieldable connection between said rotatable members comprising a separate composite unit disposed within the annular space between said cylindrical surfaces.

This application constitutes a division of my application filed January 26, 1959 bearing Serial No. 789,027, now Patent No. 2,977,819.

One of the essential objects of the invention is to provide a vibration dampener wherein the composite unit is preformed before being inserted into the annular space between the opposed concentric surfaces of the spaced apart inner and outer relatively rotatable members.

Another object is to provide a vibration dampener wherein the preformed composite unit is so formed that such unit may be quickly and easily inserted into the annular space mentioned.

Another object is to provide a vibration dampener wherein the preformed composite unit includes elastic material that is adapted to be stretched axially and made thinner within the annular space during insertion of the unit into the annular space.

Another object is to provide a vibration dampener wherein uniformity of stretch or stress in the elastic material may be obtained when the preformed unit is inserted into the annular space, regardless of how much the width of the opposed concentric surfaces may exceed the width of the elastic material.

Another object is to provide a vibration dampener wherein the preformed composite unit includes a relatively thin annular metal strip that may constitute the means by which the composite unit, including the elastic material, may be inserted into the annular space between the opposed substantially concentric surfaces of the spaced apart relatively rotatable members.

Another object is to provide a vibration dampener wherein the elastic material may comprise individual slabs formed separately from each other which may be permanently bonded to one or both sides of the metal strip mentioned before the preformed composite unit is inserted in the annular space.

Another object is to provide a vibration dampener wherein the elastic material may be in the form of separate continuous strips which may be permanently bonded in surface to surface relation to one or both sides of the metal strip mentioned before the preformed composite unit is inserted into the annular space.

Another object is to provide a vibration dampener in which the yieldable connection between the rotatable members is effected solely by the composite unit disposed within the annular space between the relatively rotatable members.

Another object is to provide a vibration dampener wherein the combined or overall cross-sectional thickness of the metal strip and elastic material bonded thereto is initially greater than the radial width of the annular space mentioned, whereby the elastic material is under compression between the opposed substantially concentric surfaces of the rotatable members after the preformed composite unit has been inserted into the annular space mentioned.

Other objects, advantages, and novel details of construction of this invention will be made more apparent as this description proceeds, especially when considered in connection with the accompanying drawings wherein:

FIG. 1 is a cross-sectional view of an assembly in which the vibration dampener of the invention is incorporated.

FIG. 2 is a top plan view of the initial form of the insert employed in the invention.

FIG. 3 is an edge view of the insert shown in FIG. 2.

FIG. 4 is an edge view of the insert shown in FIGS. 2 and 3 when bent to circular form for insertion into the assembly.

FIG. 5 is a side view, partly in section, of the insert shown in FIG. 4.

Figure 6:
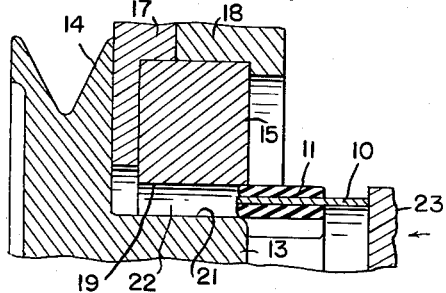
FIG. 6 is a fragmentary sectional view of the insert and rotatable concentric members prior to the introduction of the insert, together with forms and the tool employed in the inserting operation.

In FIGS. 2 and 3 it will be seen that the insert initially comprises a flat rectangular thin metal strip 10, preferably steel, to each side of which are bonded a plurality of shaped resilient elements or slabs 11 formed from rubber or other curable elastomer. These elements 11 are permanently bonded to the metal strip 10 by curing the elements to the strip. By initially bonding the rubber, either in the form of a continuous band or in sections, to the thin metal strip, a preformed composite unit is obtained. The steel strip 10 with the rubber bonded thereto can then be bent into circular form. This is preferable to bonding a continuous ring of rubber onto the inner surface of a cast iron inertia member, and then pressing such assembly onto a hub member with the aid of a lubricant, because such procedure involves quite costly molds. In fact, a better bond is obtained on steel than on cast iron. Furthermore, the bonding of the rubber to a cast iron inertia member is rather uncertain. Although the elastic elements or slabs 11 shown by full lines are in spaced relation relative to each other, the invention is not so limited, because under certain conditions it may be desirable to bond a continuous strip of elastic or rubber-like material instead of the slabs 11 to either side of the metal strip, or to bond separate continuous strips of elastic or rubber-like material instead of the slabs 11 to opposite sides of the metal strip, as indicated by dotted lines 12 in FIGS. 3 and 4.

It will be observed in the several figures that the width of the rubber elements is somewhat less than that of the metal strip, it being intended that, after assembly, a portion of the metal strip protrude axially therefrom as shown in FIG. 1. The main purpose for having this portion protrude is to provide for relative movement of portions of the rubber with respect to the metal strip and for cooling the insert, there being a tendency for the rubber to become heated by the continuous deformations to which it is subjected under operating conditions.

After the rubber elements 11 have been bonded to the flat metal strip 10, the composite unit is bent to circular form as shown in FIG. 4, the rubber elements then being circumferentially spaced therearound. In this form it is forced into the space between the concentric surfaces respectively, of a rotatable body, such as the hub 13 of pulley 14, and an inertia member 15 which may be an annular mass of metal. The combination of a pulley keyed to a crankshaft 16, and an inertia member concentric with a hub of said pulley is conventional, and various forms of dampening means have been employed between the inertia member and the hub of the pulley. The present invention, therefore, resides in the novel form of preformed composite insert, and the manner of forming and assembling it with the rotatable members.

Figure 7:
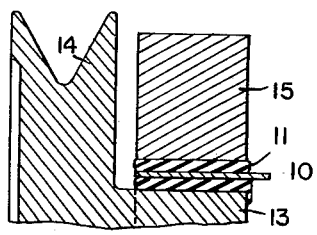
FIG. 7 is a fragmentary sectional view of the insert and rotatable concentric members after forced insertion of the insert into the assembly.

As shown in FIG. 6, there is provided a fixture comprising two spacer sections 17, 18, which position the inertia member 15 with respect to the hub 13 so that the opposed surfaces 19, 21 are maintained in concentric relation, thus providing an annular space 22 between members 13 and 15. The radial width of this space 22 is less than the initial combined over-all cross-sectional thickness of the composite unit forming the yieldable insert. The forward face of pulley 14 is then positioned in abutting relation to a fixed frame (not shown), after which a suitable annular tool, a portion of which is indicated at 23, imposes sufficient pressure on the outer free edge of the metal strip 10 to force the insert into space 22. Since the radial width of this space is less than the initial thickness of the composite unit forming the insert, the rubber of said unit will be stretched a substantial amount and placed under tension as it is forced between concentric surfaces 19 and 21. At the same time the rubber of the composite unit tends to assume its original form and, since it is disposed within a space less than that of the initial thickness of the composite unit, it will also be under compression. When the composite unit is fully introduced into the space 22, as shown in FIG. 7, the rubber of said unit is elongated and under compression, but the tendency of the rubber to resume its initial form effects an intimate frictional bond between the insert and the concentric members 13 and 15.

While the bonding of the rubber elements to the metal strip has been described as being effected by curing the rubber to the metal, the rubber may be adhered to the metal by other suitable methods such as by adhesives. The preferred initial step is one in which the rubber elements are bonded to a flat metal strip which is subsequently bent to circular form, but it is within the concept of the invention to bond the rubber to a preformed continuous metal band. Other modifications within the terms of the claims are also contemplated.

What I claim my invention is:

1. The combination with spaced apart inner and outer relatively rotatable members provided with opposed cylindrical surfaces concentric with the axis of rotation of said members and providing an annular space therebetween, a yieldable connection between said rotatable members disposed within said annular space and comprising a separate preformed composite insert including a relatively thin substantially annular metal strip within said annular space between and concentric with said cylindrical surfaces, and elastic material constituting vibration dampening means for said rotatable members bonded permanently in surface-to-surface relation to the radially opposite surfaces of said strip and disposed in surface-to-surface frictional engagement with the opposed cylindrical surfaces of said rotatable members, the radial width of the annular space aforesaid being less than the initial combined overall cross-sectional thickness of said strip and elastic material in the free state of said elastic material, whereby said entire insert is under compression between said cylindrical surfaces.

2. The structure defined in claim 1, wherein the elastic material bonded to one of said opposite surfaces of said metal strip comprises individual slabs spaced circumferentially of said metal strip, and the elastic material bonded to the other of said opposite surfaces of said metal strip comprises a continuous substantially annular strip extending circumferentially of said metal strip.

3. The structure defined in claim 1, wherein the elastic material bonded to one of said opposite surfaces of said metal strip is entirely separate and independent of the elastic material bonded to the other of said opposite surfaces of said metal strip, whereby the longitudinal edges of said metal strip are uncovered.

4. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal strip within said annular space between and concentric with said cylindrical surfaces, and continuous substantially annular strips of elastic material constituting vibration dampening means for said rotatable members extending circumferentially of and respectively bonded permanently in surface-to-surface relation to the radially opposite surfaces of said metal strip and respectively disposed in surface to surface frictional engagement with the opposed cylindrical surfaces of said rotatable members, the radial width of the annular space aforesaid being less than the initial combined overall cross-sectional thickness of said metal strip and said elastic strips in the free state of said elastic strips, whereby said entire insert is under compression between said cylindrical surfaces.

5. The structure defined in claim 4, wherein said annular strips of elastic material are entirely separate from and independent of one another so that the opposite circumferentially extending edges of said metal strip are uncovered.

6. The structure defined in claim 4, wherein the width of said metal strip is greater than the widths of said elastic strips, and said elastic strips are closer to one circumferentially extending edge of said metal strip than to the other thereof.

7. The structure defined in claim 4, wherein one of said elastic strips is of uniform cross-section throughout its circumferential extent, and the other of said elastic strips is of uniform cross-section throughout its circumferential extent.

8. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal strip within said annular space between and concentric with said cylindrical surfaces, a first series of individual slabs of elastic material bonded permanently in surface-to-surface relation to one of the radially facing surfaces of said strip at circumferentially spaced points thereof, and a second series of individual slabs of elastic material bonded permanently in surface-to-surface relation to the other of the radially facing surfaces of said strip at circumferentially spaced points thereof, said first and second series of individual slabs of elastic material constituting vibration dampening means for said rotatable members and respectively disposed in surface-to-surface frictional engagement with the opposed cylindrical surfaces of said rotatable members, the radial width of the annular space aforesaid being less than the initial combined overall cross-sectional thickness of said strip and any of the individual slabs in the free state of said slabs, whereby said entire insert is under compression between said cylindrical surfaces.

9. The structure defined in claim 8, wherein the individual slabs bonded to one of the opposite surfaces of said metal strip are of uniform size and shape, and the individual slabs bonded to the other of said opposite surfaces of said metal strip are of uniform size and shape.

10. The structure defined in claim 8, wherein the individual slabs bonded to one of the opposite surfaces of said metal strip are spaced uniformly apart circumferentially of said metal strip, and the individual slabs bonded to the other of said opposite surfaces of said metal strip are spaced uniformly apart circumferentially of said metal strip.

11. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal strip within said annular space between and concentric with said cylindrical surfaces, elastic material bonded permanently in surface-to-surface relation to one of the radially facing surfaces of said strip and disposed in surface-to-surface frictional engagement with the cylindrical surface of one of said rotatable members, and friction material bonded permanently in surface-to-surface relation to the other of the radially facing surfaces of said strip and disposed in surface-to-surface frictional engagement with the cylindrical surface of the other of said rotatable members, the radial width of the annular space aforesaid being less than the initial combined overall cross-sectional thickness of said strip and the material bonded to opposite surfaces thereof in the free state of said material, whereby said entire insert is under compression between said cylindrical surfaces.

References Cited in the file of this patent

UNITED STATES PATENTS

| | | |
|---|---|---|
| 1,716,495 | Macauley | June 11, 1929 |
| 1,805,357 | Breer | May 12, 1931 |
| 1,931,027 | Lee | Oct. 17, 1933 |
| 1,962,746 | Lee | June 12, 1934 |
| 2,198,135 | Strasburg et al. | Apr. 23, 1940 |
| 2,594,555 | Hardy | Apr. 29, 1952 |
| 2,760,359 | Wildhaber | Aug. 28, 1956 |
| 2,795,036 | Haushalter | June 11, 1957 |
| 2,795,037 | Haushalter | June 11, 1957 |
| 2,882,747 | Haushalter | Apr. 21, 1959 |

FOREIGN PATENTS

| | | |
|---|---|---|
| 650,891 | Great Britain | Mar. 7, 1951 |
| 1,231,274 | France | Apr. 11, 1960 |